Figure 1:
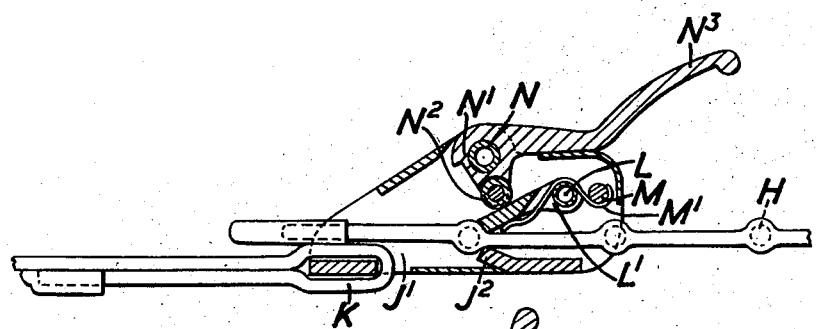

June 2, 1959 A. A. LETHERN ET AL 2,888,729
TENSION MEMBERS FORMED OF WOVEN WEBBING
AND DEVICES FOR USE THEREWITH
Filed Oct. 22, 1954

INVENTORS
ALBERT A. LETHARN
JOSEPH S. QUIRICO
BY Watson, Cole, Grindle &
Watson
ATTORNEYS United States Patent Office 2,888,729
Patented June 2, 1959

2,888,729

TENSION MEMBERS FORMED OF WOVEN WEBBING AND DEVICES FOR USE THEREWITH

Albert Alexander Lethern and Joseph Secondo Quirico, London, England, assignors to The Mills Equipment Co. Limited, London, England, a company of Great Britain Application October 22, 1954, Serial No. 464,155

Claims priority, application Great Britain November 5, 1953

5 Claims. (Cl. 24—206)

This invention relates to tension members formed of woven webbing such, for example, as safety belts or harness formed of such webbing as used in aircraft, and suspension devices formed of webbing and to securing devices, for example buckles, for use therewith and has for an object the provision of a construction which will enable the effective length of a tension member formed of webbing to be readily adjusted and/or released at will while providing adequate strength at any position of adjustment.

According to existing practice, for example in safety harness or belts made of woven webbing, various arrangements are used for enabling the effective length of the webbing to be varied, including buckles with clamping means arranged to grip the webbing frictionally at any desired point in its length; and pins engaging eyelets in the webbing. Where quick-release is necessary either the frictional buckles have been arranged to provide for such quick-release or separate quick-release devices have been provided which normally connect appropriate parts of the belt or harness to one another. In such existing arrangements where reliance is placed upon frictional clamping of the webbing, this clamping not only depends for effectiveness on the thickness of the webbing, which may vary, but has to be effected and continuously maintained with considerable force which tends to distort the webbing. Moreover such frictional clamping usually results in a large variation in the force necessary for quick release with variations in the tensional load upon the webbing. On the other hand arrangements employing eyelets and pins provide only a comparatively weak connection and impose high local stresses upon the webbing.

According to the present invention a tension member in the form of a length of woven webbing has formed therein, in the weaving process, a series of spaced tubular pockets extending transversely of its length, and a rod-like element is disposed in each pocket to form with the wall of the pocket a rib-like thickening of the web. The tension member can then be used in combination with a securing device formed to provide a slot which is of sufficient width to accommodate freely the parts of the webbing between the rib-like thickenings but will not permit the passage of the thickenings.

Thus by arranging the thickenings at appropriately spaced intervals and bringing the appropriate part of the webbing into position within a slot of appropriate width in a securing device, it is possible to vary the effective length of the webbing while moreover the connection between the webbing and the securing device will at any position of adjustment be of adequate strength.

Conveniently the pockets are woven in the webbing with one end of each pocket open and the other end closed, and the initially open ends of the pockets are closed by stitching after insertion of the rod-like elements. Thus the rod-like elements are slightly shorter than the width of the webbing.

In any case, the rod-like elements may be formed of a rigid material such as metal or a hard plastic substance, or may be flexible as by being formed of flexible plastic material, lengths of hard cord or the like or as coiled springs of approprate length so as to permit bending of the webbing as a whole about lines parallel to its length while tending always to return it to its flat form after such bending. Moreover when the rod-like elements are formed of rigid material each of such elements may comprise two or more separate sections together forming an element of the required length to extend substantially across the webbing, and thus providing the required rigid rib-like thickening while permitting bending of the webbing as a whole about lines parallel to its length.

In a preferred form the webbing is woven in a generally known manner in two plies which are united by longitudinal stitching of binder warp threads evenly spaced across the width of the webbing in a manner well known per se, except where the pockets occur, while moreover the main warp threads of one of the two plies interchange with the main warp threads of the other of the two plies at regular intervals in the length of the webbing, thus forming pockets, and the main warp threads which lie adjacent to one side of the lengths of webbing between the pockets lie on the other side of the parts of the webbing constituting the pockets. Thus the main warp threads of one of the two plies interchange with the main warp threads of the other of the two plies on one side of each pocket longitudinally of the webbing and vice-versa at the other side of each pocket longitudinally of the webbing and thus provide the maximum resistance to opening up of either side of the pocket by the tendency for the rod-like element inserted in the pocket to move longitudinally of the webbing, when load is applied.

In use the webbing according to the invention will be used in conjunction with one or more securing devices each formed to provide a slot between two edges through which slot the webbing extends, the slot having a width such that the parts of the webbing between the pockets can lie freely therein whereas the rib-like thickenings cannot pass therethrough. The slot in such a securing device might be of fixed width with a normally open end to allow any part of the webbing between the pockets to be slid into it, with or without a movable securing member for closing the previously open end of the slot and thus preventing the webbing slipping unintentionally therethrough.

Figure 2:
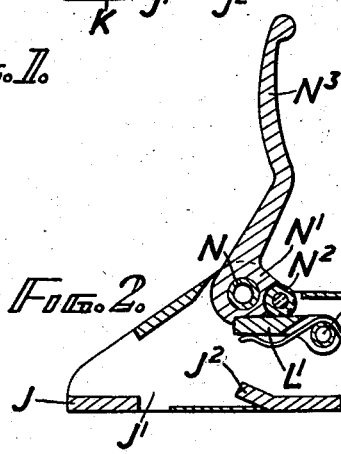
Figure 3:
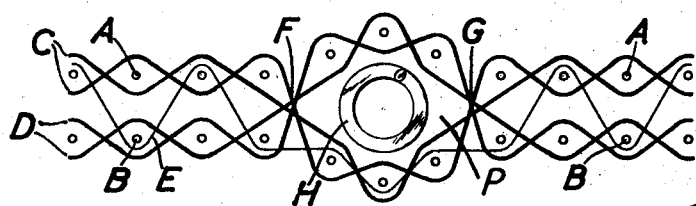
Figure 4:
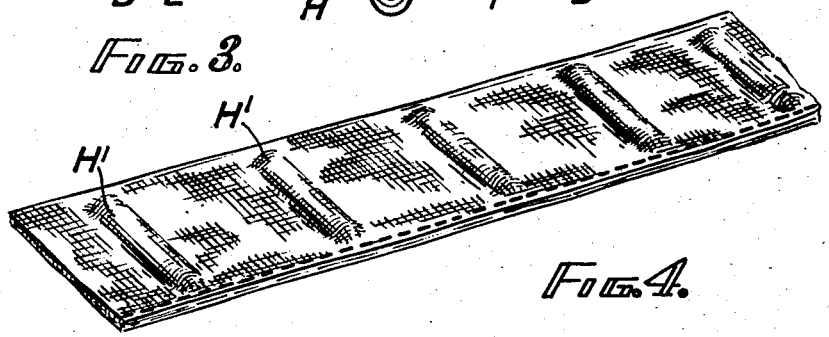

In one particularly convenient example, however, the securing device will be in the form of a buckle and one construction of a tension member according to the invention and the combination of such tension member with a buckle according to the invention are illustrated by way of example in the accompanying drawings, in which:

Figure 1 is a sectional side elevation of the buckle and tension member with the buckle in its operative position, Figure 2 is a similar view to Figure 1 showing the buckle only in its inoperative position, Figure 3 is an enlarged diagrammatic view showing the general form of the weave of the tension member, and Figure 4 shows a section of the tension member in perspective.

In the construction shown in the drawings the tension member is in the form of a length of webbing which is woven in a manner known per se so as to provide in effect two plies, each ply having its own weft threads. In Figure 3 the weft threads A constitute the weft threads of one ply (hereinafter called the upper ply) while the weft threads B constitute the weft threads of the other or lower ply, while the warp threads C and D co-operate with so-called binder warp thread E which is common to both plies except at one side of each pocket. The web shown is so woven as to provide a series of evenly spaced tubular pockets P extending transversely across the web and initially open along one side of the web while being closed along the other side. To this end the web is so woven that over the lengths which are to lie between the pockets the binder warp thread E unites the two plies whereas at each point where a pocket is to be formed not only is this binder thread woven only into one of the plies but the warp threads C and D which are individual to the plies cross over as shown at F and G. Thus during weaving of each part of the web to form a pocket the plies are separated, while moreover at each side of each pocket the main warp threads cross from one ply to the other, thus providing considerable strength against any force tending to burst open the plies along the lines where the pockets end. For convenience of illustration the binder warp thread E is shown as thinner than the warp threads C and D and it is to be understood that this may not be so in practice.

Inserted into each pocket is a short length of flexible material, for example a length of coil spring, indicated at H, so as to provide thickenings as indicated at $H^1$ in Figure 4 at spaced intervals in the web. After insertion of the lengths of coiled spring H into the pockets a length of stitching is applied completely along the edge of the web through which the pockets initially open so as to close the previously open ends of the pockets and thus retain the lengths of spring H in the pockets.

If desired instead of a single relatively hard flexible spring or like member being inserted into each pocket a series of lengths of comparatively rigid material may be so inserted for the purpose of providing the necessary thickenings while enabling a degree of bending of the web about lines parallel to its length.

In some cases, moreover, the lengths of material inserted into the pockets may be of a completely rigid nature, as for example, metal or a hard comparatively inflexible plastic material.

The general weaving procedure for making a length of webbing from two plies which are united at some points but are separated at other points to form pockets is well known in itself and thus forms no part of the present invention.

The buckle in the construction shown in the drawings comprises a base plate J formed of suitable gauge sheet metal and of approximately rectangular form and having a width slightly greater than the width of the webbing, this base plate having at one end a slot $J^1$ through which can be passed a loop of webbing as indicated at K constituting, for example, one end of a belt formed from the webbing or serving as a means for attaching the buckle to some desired part. Struck up from the base plate J at approximately the centre of its length is a lip $J^2$ which extends substantially completely across the width of the base plate, the edge of this lip facing the end of the base plate in which the slot $J^1$ is formed.

Formed integrally with and projecting vertically upwards from the sides of the base plate are two parallel side plates Q, and extending between the two side plates is a pivot pin L on which is pivotally mounted the rear end of a movable plate $L^1$ the free end of which lies approximately immediately above the lip $J^2$.

Also extending between the side plates is a pin M on which are mounted two or more springs $M^1$ arranged to act upon the plate $L^1$ in a direction tending always to move its free edge away from the lip $J^2$.

Extending between the side plates approximately above the lip $J^2$ is a second pivot pin N on which is mounted a control member $N^1$ including a portion carrying a roller $N^2$, acting as a cam which bears upon the upper face of the plate $L^1$ as shown, and a plate-like operating lever $N^3$ which has a width slightly less than the distance between the side plates and is formed so that when in its operative position (shown in Figure 1) its free edge can readily be engaged and lifted by the fingers of one hand.

As shown in Figure 4 when it is to be engaged by the toggle is passed through the buckle between the side plates and between the free edge of the plate $L^1$ and the lip $J^2$, while the control member $N^1$ is in the position shown in Figure 2, that is to say its inoperative position with the free edge of the plate $L^1$ separated by a substantial distance from the lip $J^2$. The member $N^3$ is then moved into the position shown in Figure 1, when the distance separating the edge of the plate $L^1$ from the lip $J^2$ will be such as to permit free movement between the two parts of any portion of the web which lies between two pockets but will prevent passage of the thickening formed by a pocket with its inserted member H. The disposition of the pivot N will moreover preferably be such that when the buckle is in its operative position as shown in Figure 1, any separating force tending to lift the plate $L^1$ into its inoperative position will tend to force the member $N^1$ still more firmly into the position shown in Figure 1. It will nevertheless be seen that the manual force required at any time to move the member $N^3$ into its inoperative position will be relatively unaffected by the tension in the web and the force which the web thus exerts upon the edge of the plate $L^1$ although with increases in the tension in the belt there will be a small increase in the force required to move the member $N^3$ into its inoperative position. It will be apparent that by suitable design the relationship between the tension in the belt at any time with the parts in the position shown in Figure 1 and the force necessary to move the member $L^1$ into its inoperative position can be determined to meet requirements and so as to ensure that while inadvertent release of the buckle tends to be avoided excessive force will not be required to release the buckle even if the web is under high tension in an emergency.

What we claim as our invention and desire to secure by Letters Patent is:

1. The combination of a tension member comprising a length of woven webbing having formed therein a series of spaced tubular pockets extending transversely of its length and a rod-like element disposed and enclosed in each pocket to form with the wall of the pocket a rib-like thickening of the web, with a securing device formed to provide a slot between two edges having open ends through which the said webbing extends, the slot having a width such that the parts of the webbing between the pockets can lie freely therein whereas the rib-like thickenings cannot pass therethrough, said securing device comprising a base plate formed to provide two parallel side walls projecting from opposite sides of the base plate and between which the webbing can pass, a movable plate pivoted adjacent to one edge to the side walls about an axis parallel to, but displaced from, the plane of the base plate and having an opposite edge portion which lies adjacent to the edge portion provided on the base plate, spring means tending normally to move the movable plate away from the base plate, and a manually operable cam member also pivoted to the side walls about an axis parallel to the plane of the base plate and arranged to act on the movable plate so as to move it toward the base plate against the action of the spring means, the arrangement being such that with the cam member in its inoperative position the thickened parts of the tension member can pass freely between the adjacent edge portions on the base plate and the movable plate, whereas when the cam member is in its operative position only the parts of the webbing between the pockets can pass between such edge portions.

2. The combination of a tension member and a securing device as claimed in claim 1 in which the cam member is so arranged that in moving from its inoperative into its operative position it passes through a dead center position whereby when the cam member is in its operative position any force tending to separate the two edge portions referred to tends to force the cam member more firmly into its operative position.

3. A tension member comprising a length of woven webbing having formed therein a series of spaced tubular pockets extending transversely of its length and a rod-like element disposed and enclosed in each pocket to form with the wall of the pocket a rib-like thickening of the web, the webbing being woven in two plies which are united except where the pockets occur by longitudinal stitching or binder warp threads evenly spaced across the width of the webbing while the main warp threads of one of the two plies interchange with the main warp threads of the other of the two plies at regular intervals in the length of the webbing to form the pockets and the main warp threads which lie adjacent to one side of each length of the webbing between two pockets lie on the other side of the lengths of webbing constituting the adjacent pockets.

4. A tension member as claimed in claim 3 in which the rod-like elements are flexible to permit bending of the webbing about lines parallel to its length.

5. The combination of a tension member as claimed in claim 3 and a securing device formed to provide a slot between two edges having open ends through which the said webbing extends, the slot having a width such that the parts of the webbing between the pockets can lie freely therein whereas the rib-like thickenings cannot pass therethrough.

References Cited in the file of this patent

UNITED STATES PATENTS

| | | |
|---|---|---|
| 754,194 | Buchanan | Mar. 8, 1904 |
| 881,679 | Gros | Mar. 10, 1908 |
| 1,323,541 | Morinsky | Dec. 2, 1919 |
| 1,378,946 | Gilson | May 24, 1921 |
| 2,301,047 | Hendley | Nov. 3, 1942 |

FOREIGN PATENTS

| | | |
|---|---|---|
| 674,331 | France | Jan. 27, 1930 |